United States Patent Office 3,089,908
Patented May 14, 1963

3,089,908
PREPARATION OF TEREPHTHALALDEHYDE FROM XYLENE DICHLORIDE
Joachim C. E. Schult, Bellevue, Pa., and Marvin O. Shrader, deceased, late of Pittsburgh, Pa., by Lula H. Shrader, administratrix, Pittsburgh, Pa., assignors to Pittsburgh Chemical Company, Pittsburgh, Pa., a corporation of Pennsylvania
No Drawing. Filed Sept. 6, 1960, Ser. No. 55,821
5 Claims. (Cl. 260—599)

This invention relates to the preparation of terephthalaldehyde.

Terephthalaldehyde is finding increasing use as an intermediate in the dyestuff, polymer and pharmaceutical fields. Thus it has been prosposed to use terephthalaldehyde with polyvinyl alcohol to prepare polyvinyl acetals.

It is a primary object of the present invention to develop a novel method for preparing terephthalaldehyde.

Another object is to prepare terephthalaldehyde utilizing xylidene dichloride as the starting material.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the vapor phase reaction of xylylene dichloride with steam. Preferably the reaction is carried out in the presence of silica gel and Alundum.

A good yield of terephthalaldehyde can be obtained if metal oxides and/or silica gel are used as catalysts. Materials such as activated alumina, Alundum, magnesium oxide, zinc oxide are effective catalysts in themselves. Their activity can be increased by additions of oxides of the transition metals of groups IV, V and VI such as chromium, molybdenum, vanadium, cobalt, titanium and cerium, e.g., chromic oxide, molybdenum oxide, vanadium pentoxide, cobaltic oxide, titanium dioxide and ceric oxide. The reaction is carried out at a temperature of 250–550° C.

It is surprising that terephthalaldehyde is formed in this reaction since the expected product of the vapor phase hydrolysis of xylylene dichloride is xylylene glycol.

Example 1

Superheated steam at 300–450° C. was passed through molten p-xylylene dichloride at 150±15° C. The resulting vapor mixture was directed first through a preheater at 300±5° C. and then through a 12 inch tube packed with a mixture of ¼ inch silica gel and Alundum. The temperature in the reaction tube was 425–475° C. The vapor leaving the reaction tube was condensed in a container surrounded by ice. Analysis of the product showed that it was a mixture of terephthalaldehyde and unreacted xylylene dichloride. The yield of terephthalaldeyhde was 41.7%. No xylylene diglycol could be detected in the product.

Example 2

Low pressure steam (100° C.) was passed through molten p-xylylene dichloride at 150±15° C. The resulting vapor mixture was passed first through a preheater at 300±5° C. and then through a 12 inch tube packed with ¼ inch activated alumina. The temperature in the reaction tube was 500–550° C. Analysis of the condensed product showed that it was a mixture of terephthalaldehyde and unreacted xylylene dichloride. The yield of terephthalaldeyhde was 32.8%. No xylylene diglycol could be detected in the product.

Example 3

This example was the same as Example 2 except a catalyst consisting of 90% silica gel, 8.75% molybdenum oxide and 1.25% cobalt oxide was used. The temperature in the reaction tube was 250–275° C. The yield of terephthalaldehyde was 47.6%. No xylylene diglycol could be detected in the product.

What is claimed is:

1. A process of preparing terephthalaldehyde comprising reacting p-xylylene dichloride in the vapor phase with steam at a temperature of 250–550° C. in the presence of a catalyst selected from the group consisting of silica gel, alumina, magnesium oxide and zinc oxide.

2. A process according to claim 1 wherein a mixture of silica gel and alumina are employed as a catalyst.

3. A process according to claim 2 wherein the temperature is 425–475° C.

4. A process according to claim 1 wherein there is also employed a metal oxide of the group consisting of oxides of chromium, molybdenum, vanadium, cobalt, titanium and cerium.

5. A process according to claim 1 wherein there is employed silica gel as a catalyst.

References Cited in the file of this patent

FOREIGN PATENTS 816,253    Great Britain _____ July 8, 1959